US009380594B1

(12) United States Patent
Malmirchegini et al.

(10) Patent No.: US 9,380,594 B1
(45) Date of Patent: Jun. 28, 2016

(54) AUTONOMOUS LAYER MANAGEMENT

(71) Applicant: QUALCOMM Incorporated, San Diego, CA (US)

(72) Inventors: Mehrzad Malmirchegini, San Diego, CA (US); Mutaz Zuhier Afif Shukair, San Diego, CA (US); Salil Sawhney, San Diego, CA (US); Mouaffac Ambriss, San Diego, CA (US); Peter Rached, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/719,147

(22) Filed: May 21, 2015

(51) Int. Cl.
*H04W 72/04* (2009.01)
*H04W 72/10* (2009.01)
*H04W 24/10* (2009.01)
*H04W 24/08* (2009.01)

(52) U.S. Cl.
CPC .............. *H04W 72/10* (2013.01); *H04W 24/08* (2013.01); *H04W 24/10* (2013.01)

(58) Field of Classification Search
CPC ...... H04W 72/04; H04W 16/32; H04W 16/12
See application file for complete search history.

(56) References Cited

U.S. PATENT DOCUMENTS

| 2006/0166677 | A1 | 7/2006 | Derakshan et al. | |
| 2012/0046066 | A1* | 2/2012 | Tamura | H04L 1/0029 455/525 |
| 2014/0004862 | A1 | 1/2014 | Ekemark | |
| 2014/0066077 | A1 | 3/2014 | Brisebois | |
| 2014/0369252 | A1* | 12/2014 | Wang | H04W 4/06 370/312 |
| 2014/0376515 | A1* | 12/2014 | Lei | H04W 36/0061 370/331 |

FOREIGN PATENT DOCUMENTS

WO   WO-2014016280 A1   1/2014

OTHER PUBLICATIONS

Fotiadis P., et al., "Multi-Layer Traffic Steering: RRC Idle Absolute Priorities & Potential Enhancements," IEEE Vehicular Technology Conference (VTC Spring), 2013, pp. 1-5.
"Exploring the World of Wireless Everything Under the SON," Signals Ahead, vol. 9, No. 4, Apr. 25, 2013, pp. 1-44.

* cited by examiner

*Primary Examiner* — Michael T Vu
(74) *Attorney, Agent, or Firm* — Arent Fox LLP

(57) ABSTRACT

Systems, methods, and apparatuses for improved traffic management in wireless communications are disclosed. Aspects of the present disclosure provide real-time radio frequency (RF) assessments to a network by leveraging measurement reports from user equipment (UE). In some aspects, the network utilizes the real-time RF assessments based on the measurement reports to adjust one or more idle-mode parameters of the UE and assign priorities to a plurality of frequencies based on their respective coverage area and/or propagation characteristics. In one example, the priority assignments for two or more of the plurality of frequencies may be inversely proportional to their respective coverage areas, so as to push UEs with acceptable signal quality to frequencies with smaller coverage area, thereby releasing frequencies with greater coverage area for UEs that are near or at the edge of the effective range of the base station.

30 Claims, 7 Drawing Sheets

AUTONOMOUS LAYER MANAGEMENT

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to meet the ever-growing user demands. One approach to meet such demand may include acquiring additional resources (e.g., installing additional base stations and/or deploying more frequency spectrums). However, such an approach can have considerable lead-time delays as well as costs in both capital expenditure and operating expenses. Moreover, with the end-users constantly moving in-and-out of the network, the network resources may be unevenly utilized amongst the plurality of mobile devices. For example, one set of frequency bands in a frequency spectrum may be overloaded, while another set may serve a considerably smaller number of users. Thus, a system for improved traffic management is desired.

SUMMARY

Systems, methods, and apparatuses for improved traffic management in wireless communications are disclosed. Aspects of the present disclosure provide real-time radio frequency (RF) assessments to a network by leveraging measurement reports from user equipment (UE). In some aspects, the network utilizes the real-time RF assessments based on the measurement reports to adjust one or more idle-mode parameters of the UE and assign priorities to a plurality of frequencies based on their respective coverage area and/or propagation characteristics. In one example, the priority assignments for two or more of the plurality of frequencies may be inversely proportional to their respective coverage areas, so as to push UEs with acceptable signal quality to frequencies with smaller coverage area, thereby releasing frequencies with greater coverage area for UEs that are near or at the edge of the effective range of the base station.

According to a first set of illustrative embodiments, a method for traffic management in a wireless communications system is disclosed. In some examples, the method may include receiving, at a base station, a measurement report from a UE and identifying a first coverage area of a first frequency and a second coverage area of a second frequency based in part on the measurement report. In some examples, the method may include assigning a first priority to the first frequency and a second priority to the second frequency based on the first coverage area of the first frequency and the second coverage area of the second frequency. Additionally or alternatively, the method may include transmitting a message to the UE comprising the first priority and the second priority assignments. In some aspects, the UE may be configured to select the first frequency or the second frequency for communication with the base station based on the first priority and the second priority assignments.

According to a second set of illustrative embodiments, an apparatus for traffic management in a wireless communication system is disclosed. The apparatus may include a receiver for receiving, at a base station, a measurement report from a UE and a spectrum characteristic determination component for identifying a first coverage area of a first frequency and a second coverage area of a second frequency based in part on the measurement report. The apparatus may further include a priority assignment component for assigning a first priority to the first frequency and a second priority to the second frequency based on the first coverage area of the first frequency and the second coverage of the second frequency. In yet further examples, the apparatus may include a transmitter for transmitting a message to the UE comprising the first priority and the second priority assignments. In some aspects, the UE may be configured to select the first frequency or the second frequency for communication with the base station based on the first priority and the second priority assignments According to a third set of illustrative embodiments, another apparatus for traffic management in a wireless communication system is disclosed. In some examples, the apparatus may include means for receiving, at a base station, a measurement report from a UE and means for identifying a first coverage area of a first frequency and a second coverage area of a second frequency based in part on the measurement report. In some examples, the apparatus may further include means for assigning a first priority to the first frequency and a second priority to the second frequency based on the first coverage area of the first frequency and the second coverage area of the second frequency. Additionally or alternatively, the apparatus may include means for transmitting a message to the UE comprising the first priority and the second priority assignments. In some aspects, the UE may be configured to select the first frequency or the second frequency for communication with the base station based on the first priority and the second priority assignments.

According to a fourth set of illustrative embodiments, a computer-readable medium storing code for traffic management is disclosed. In some examples, the code may comprise instructions executable to receive, at a base station, a measurement report from a UE and identify a first coverage area of a first frequency and a second coverage area of a second frequency based in part on the measurement report. The instructions may further be executable to assign a first priority to the first frequency and a second priority to the second frequency based on the first coverage area of the first frequency and the second coverage area of the second frequency. In some examples, the code may include instructions to transmit a message to the UE comprising the first priority and the second priority assignments. In one or more examples, the UE may be configured to select the first frequency or the second frequency for communication with the base station based on the first priority and the second priority assignments The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Figure 1:
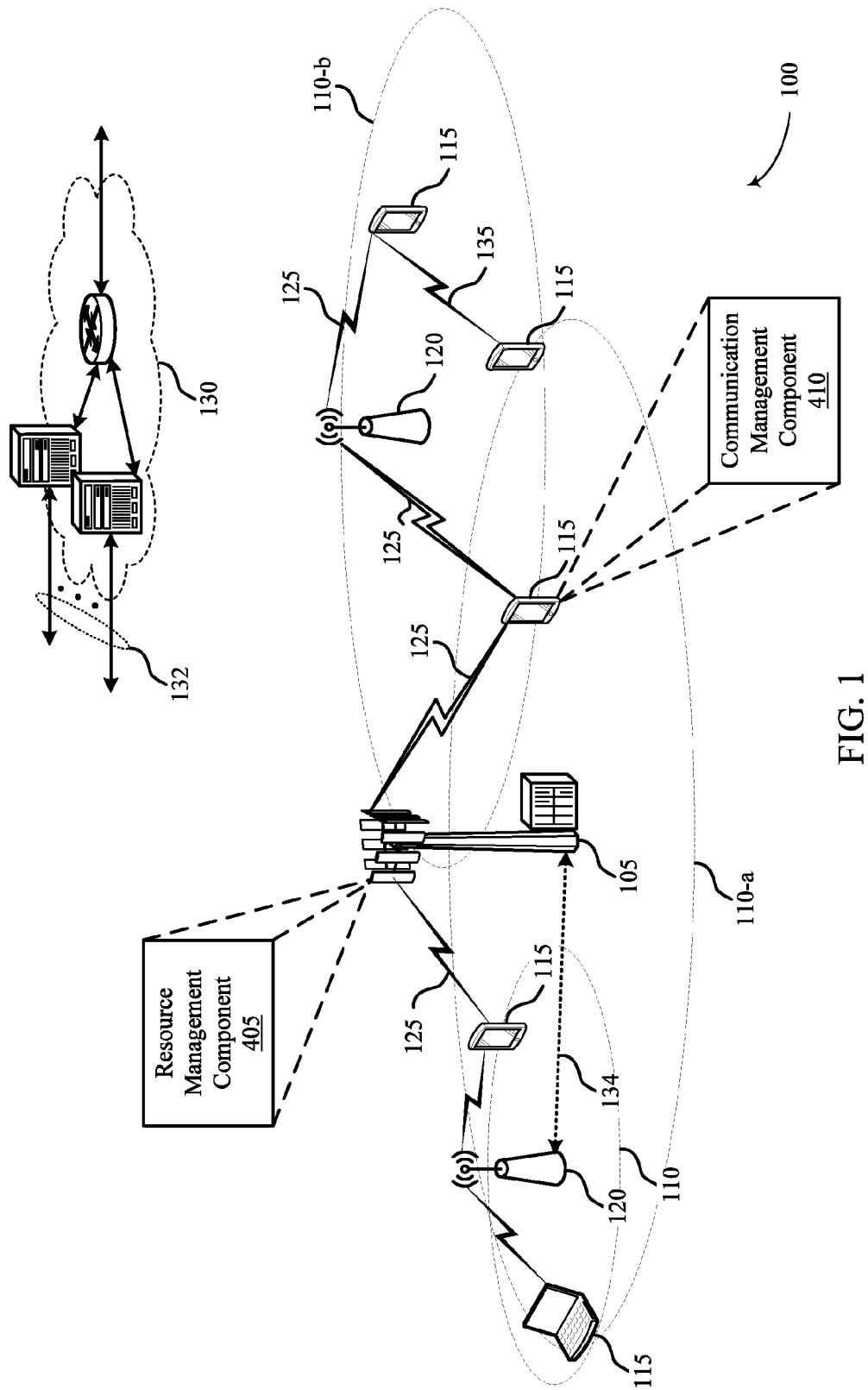
FIG. 1 illustrates an example of a wireless communications system for traffic management in accordance with various aspects of the present disclosure.

Various aspects are now described with reference to the drawings. In the following description, for purposes of explanation, numerous specific details are set forth to provide a thorough understanding of one or more aspects. It should be understood, however, that such aspect(s) may be practiced without these specific details. Also, as used herein, a component and/or module may be one of the parts that make up a system, may be hardware or software, and may be divided into other components.

During the past few decades, wireless technology has seen a tremendous growth with introduction of high-end mobile devices that contribute towards ever-increasing bandwidth demands. Current cellular systems require manual configuration and management of networks, which may be costly, time consuming and error prone due to the number of mobile devices operating in a limited spectrum. Moreover, as discussed above, with the end-users constantly moving in-and-out of the network, the available network resources may be unevenly utilized amongst the plurality of mobile devices. For example, one set of frequency bands in a frequency spectrum may be overloaded, while another set may serve a considerably smaller number of users.

Cellular frequencies are a set of frequency ranges within the radio frequency spectrum allocated for cellular use. The term "frequency band" as used herein may refer to a range of frequencies within the radio frequency spectrum utilized for transmission and reception of signals (e.g., data and/or voice packets). In some aspects, the term "frequency" or "carrier frequency" may refer to the nominal frequency or the center frequency of a carrier wave. It should be understood that the terms "frequency," "carrier frequency" and/or "frequency band," as used herein, either individually or collectively, may be used to describe transmission of signals and/or data over electromagnetic wave at the output of a conventional amplitude-modulated (AM), or frequency-modulated (FM), or phase-modulated (PM) radio transmitter. Thus, as used herein, a "set of frequency bands," "frequency bands," "a frequency" and/or "carrier frequency" may be used interchangeably to refer to one or more frequencies within the radio frequency spectrum utilized for transmission and reception of signals. In some aspects, the radio frequency spectrum may extend from 3 Hz to 300 GHz, and may be shared by civil, government, and non-civilian users.

Returning now to the above example, even if, by way of manual configuration, network operators achieve load balancing by distributing mobile devices evenly across all available resources (e.g., multiple frequency bands or different cells), the bandwidth usage of different users may vary. For instance, a first set of users (e.g., 10 users) operating on a first frequency band may text sporadically, and thus utilize a minimal amount of the bandwidth associated with the first frequency band. Conversely, a second set of users (e.g., 10 users) operating on a second frequency band may utilize the network resources more heavily, for example, by streaming movies. Thus, these users may utilize a large amount of the bandwidth associated with the second frequency band. Thus, this load (e.g., utilization) imbalance may deteriorate the overall performance of the cellular network due to inefficient resource utilization.

In some examples, network operators, in order to achieve target traffic distribution across multiple frequency bands, may perform extensive radio frequency (RF) surveys. Network operators use the RF assessment from those RF surveys to optimize traffic load balancing goals. However, methods of conducting RF surveys are labor intensive, time consuming and expensive. Moreover, the RF surveys needs to be repeated periodically to ensure RF consistency, as RF may vary drastically depending on environment.

Even further, some systems may have difficulties achieving optimal target traffic distribution due to tendencies of the communication devices to gravitate towards frequency bands that offer the best signal based on propagation characteristics and/or coverage area. Such tendencies may slow down overall network performance. For example, when a large number of communication devices (e.g., UEs or STAs) are concentrated in a relatively small coverage area (e.g., sporting events), a number of communication devices may attach to the network via a limited number of frequency bands that may initially offer the best signal. However, as more communication devices attach to the limited number of frequency bands, a first set of frequency bands (i.e., those with a large number of attached devices) may be overloaded while a second set of frequency bands (i.e., those with a small number of attached devices) may be underutilized.

In other examples, network operators may resort to active mode load balancing that allows the active mode mobile devices (e.g., connected users) to be load balanced across cells or frequency bands to lower the overall congestion across the cell. The advantage of active load balancing may be that the network has direct knowledge of the traffic requirements and radio conditions of each user before deciding to load balance. However, load balancing active mode mobile devices may involve high signaling overhead, e.g., exchanging of measurement reports and handover messages, between a plurality of mobile devices and the network.

Accordingly, aspects of the present disclosure provide systems, methods, and apparatuses for idle mode load balancing of one or more mobile devices in an idle-mode in a multi-band network. In some aspects, the network may periodically receive a measurement report from the one or more communication device(s) (e.g., UEs or STAs). Accordingly, the network may identify respective coverage area of one or more frequency bands based on the measurement report and assign different priorities to each set of available frequency bands, such that the different priorities assigned to the one or more frequency bands are inversely proportional to their respective coverage area. For example, as the coverage area associated with a frequency band becomes larger the priority assigned to that frequency band may become smaller. Conversely, as the coverage area assigned to the frequency band becomes smaller the priority assigned to that frequency band may become larger. Additionally or alternatively, the network may transmit a message to the communication device including the assigned priorities such that a communication device may be configured to select an optimal frequency band for communication with the network based on the priority assignments.

FIG. 1 illustrates an example of a wireless communications system for traffic management in accordance with various aspects of the present disclosure. The system 100 includes base station 105, access points (AP) 120, mobile devices 115 (e.g., UEs or STAs), and a core network 130. In some aspects, the base station 105 and/or AP 120 may include resource management component 405 (see FIG. 4) for managing traffic load across multiple frequencies in accordance with various aspects of the present disclosure. Additionally or alternatively, one or more UEs 115 may include communication management component 410 (see FIG. 4) for managing communication (e.g., selecting a set of frequency bands) with the base station 105 in accordance with various aspects of the present disclosure. In some aspects, the base station 105 may be referred to as a macro cell base station, and AP 120 may be referred to as small cell base station.

The core network 130 may provide user authentication, access authorization, tracking, internet protocol (IP) connectivity, and other access, routing, or mobility functions. The base station 105 may interface with the core network 130 through backhaul links 132 (e.g., S1, etc.). The base station 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and coverage area 110-b for AP 120 may be divided into sectors making up only a portion of the coverage area (not shown). The wireless communications system 100 may include base station 105 and AP 120 of different types (e.g., macro or small cell base stations). As shown in FIG. 1, there may be overlapping geographic coverage areas 110-b created by the different base stations/APs.

In some examples, aspects of the present disclosure adjust cell reselection parameters for the idle mobile device 115 based on the current active user conditions. Adjusting cell reselection parameters may include adjusting the cell reselection criterion such that the UE may reselect to a second frequency band if the quality of the second frequency band is at least $Q_{hyst,s}$ and/or $Q_{offset,s,n}$ dB better for a fixed time period than the first frequency band quality. Thus, the cell reselection parameters define the criterion that would trigger a mobile device 115 to shift from the first frequency band to the second frequency band, for example. Generally, a handover of a mobile device 115 between a serving cell (s) and a neighboring cell (n) is based on a ranking criterion, which itself depends on a cell signal strength and a hysteresis value $Q_{hyst,s}$ and a cell-pair specific offset $Q_{offset,s,n}$. Changes of the hysteresis value and the offset may impact the trigger points of the handover, the success rate of the handover, and/or load distribution between different frequency bands or cells. The 3GPP technical specification TS 36.331 may define the related measurement configuration for the mobile devices.

In some aspects of the present disclosure, a base station 105 may dynamically adjust one or more cell reselection parameters associated with each set of frequency bands assigned to the user equipment for use in a cell reselection procedure. In some examples, the base station 105 may identify the one or more available frequency bands assigned to the mobile device 115, such that the mobile device 115 may select a frequency band from a plurality of frequency bands for communicating with the base station 105. Accordingly, dynamically adjusting the one or more cell reselection parameters associated with each set of frequency bands may modify the measurement trigger conditions for inter-frequency handover, and force mobile devices 115 to select a frequency band that has more available resources.

Moreover, aspects of the present disclosure may adjust idle-mode parameters associated with the mobile device 115 in order to ensure load balancing between a set of frequency bands served in a single cell, where each frequency band is assigned a different priority that may be inversely proportional to the coverage area of each frequency band. The term "idle-mode parameters" may refer to one or more parameters associated with a mobile device 115 that is in idle-mode. The one or more idle-mode parameters may include, but are not limited to, one or more of the parameters described in Table 1 below:

TABLE 1

| PARAMETERS | DESCRIPTION |
| --- | --- |
| qRxLevMin | The minimum RSRP requirement for cell selection/reselection |
| cellReselectionPriority | Absolute priority of the frequency layer associated with the cell |
| $S_{intrasearch}$ | Threshold used to trigger intra-frequency measurement |
| $S_{nonintrasearch}$ | Threshold used to trigger inter-frequency and/or IRAT measurements |
| $T_{Reselection}$ | Time to trigger the cell reselection |
| $Thresh_{x,High}$ | Used for reselection to higher priority frequency layer |
| $Thresh_{x,Low}$ | Used for reselection to lower priority frequency layer |

TABLE 1-continued

| PARAMETERS | DESCRIPTION |
| --- | --- |
| $Thresh_{serving,Low}$ | Threshold level to which the serving cell may fall before cell reselection to a lower frequency layer may be allowed |
| offsetFreq | Assignment of an offset to a frequency layer in ranking criteria or equal priority criteria |

Accordingly, a mobile device 115 may monitor and measure signal strengths of one or more frequency bands associated with a cell, and report the signal strengths to the base station 105 serving the mobile device 115 to determine whether an inter-frequency handover of the mobile device from a serving frequency band to a target frequency band should be performed. Thus, as the real-time traffic or quality of service (QoS) demands increase, the network may be able to identify a connected-mode parameter associated with each of the frequency bands in the frequency spectrum and adjust at least one or more idle-mode parameters of the mobile device in order to force mobile devices 115 to select a frequency band that has more available resources. The connected-mode parameters may include one or more parameters (e.g., parameters in Table 1) associated with a mobile device 115 in a connected-mode.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless link 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the system 100.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11 family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like.

The mobile devices 115 may be multi-radio devices employing adaptive scanning techniques. For example, a mobile device 115 may dynamically adapt scanning operations of one of its radios based on a signal quality of another of its radios. In some examples, a dual-radio UE 115-a, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions.

Each of the one or more communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-NII radio band, which may also be referred to as the 5 GHz or 5 G band. By contrast, the term "licensed spectrum" or "cellular spectrum" may be used herein to refer to wireless spectrum utilized by wireless network operators under administrative license from a governing agency.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Data in wireless communications system 100 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

Thus, aspects of system 100 described in FIG. 1 may be used for idle mode load balancing for one or more mobile devices in an idle-mode in a multi-band network as described in further detail below.

Figure 2:
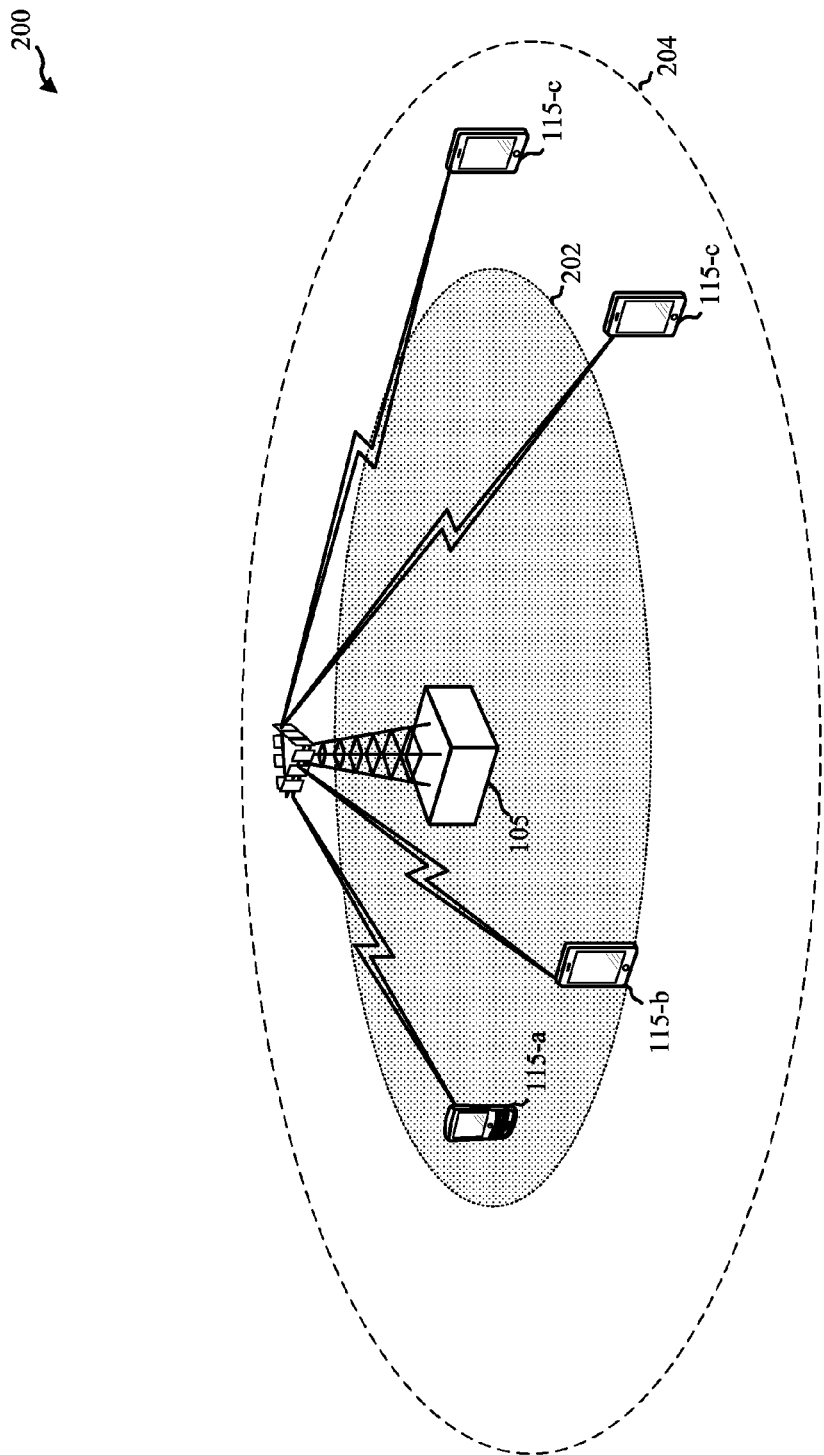
FIG. 2 illustrates another example of a wireless communications system in accordance with various aspects of the present disclosure.

FIG. 2 illustrates a system 200 in which a base station 105 may manage idle mode load balancing for one or more mobile devices 115 in a multi-band network. The base station 105 in FIG. 2 may be an example of base station 105 described above with reference to FIG. 1. Additionally or alternatively, one or more mobile devices 115 in FIG. 2 may also be example of mobile devices/UEs 115 described with reference to FIG. 1.

Within the coverage area of the base station 105, the base station 105 may serve one or more UEs 115 using multiple sets of frequency bands, where each set of frequency bands (e.g., corresponding to a particular frequency spectrum) may have different characteristics. Consequently, the base station 105 may behave differently and perform different functions depending on which set of frequency bands it is using. In some aspects, one or more UEs 115 (e.g., UE 115-*a* and UE 115-*c*) may be in connected-mode, while other UEs (e.g., UE 115-*b*) may be in an idle-mode. Additionally or alternatively, the operation of base station 105 at each set of frequency bands may have unique properties (e.g., signal quality, coverage area, and/or propagation characteristics). For example, as shown in FIG. 2, a first set of frequency bands may correspond to a frequency range of 30 KHz to 300 KHz, and the base station 105 may operate with a first coverage area 202 for the first set of frequency bands. In contrast, a second set of frequency bands may include a frequency range of 3 GHz to 30 GHz, and the base station 105 may operate with a second coverage area 204 for the second set of frequency bands.

In some examples, the second set of frequency bands (e.g., having a second coverage area 204) may initially offer higher signal quality than the first set of frequency bands (e.g., having a first coverage area 202). However, if multiple UEs (e.g., UE 115-*b*) that may otherwise be served by a first set of frequency bands instead select the second set of frequency band, the second set of frequency band may be overloaded, while the first set of frequency band may be underutilized.

Thus, aspects of the present disclosure allow the resource management component 405 of base station 105 (FIG. 1) to identify a connected-load parameter associated with each of the plurality of frequency bands and adjust the cell reselection parameters. This may cause UE 115-*b*, which is operating in an idle mode, to select and camp on a frequency band that has more available resources.

In some examples, the connected-load parameter associated with each of the plurality of frequency bands may be computed based on at least a number of active users and load capacity for each of the frequency bands. In other examples, the connected-load parameter may be calculated based on total transmit/receive power (e.g., based on received signal strength indicator (RSSI)), interference in a cell, cell throughput in downlink/uplink, noise rise, number of resource blocks, number of scheduled users per transmission time interval (TTI), random access channel (RACH) and/or physical downlink control channel (PDCCH) loading.

In some aspects, adjusting the cell reselection parameters (e.g., idle-mode parameters) may comprise assigning a first priority value to the first set of frequency bands associated with the first coverage area 202 and a second priority value to the second set of frequency bands associated with the second coverage area 204, where the first coverage area 202 may be less than or smaller than the second coverage area 204. In one or more examples, the first priority value may be a higher priority than the second priority value. Thus, the resource management component 405 of the base station 105 may assign a priority value (or simply referred to as a priority) to each set of frequency bands that may be inversely proportional to the coverage area of the base station for the respective set of frequency bands. In some aspects, adjusting the priority values may be based on a network key performance indicator (KPI).

As discussed above, the assignment of priorities to each set of frequency bands may be dependent on the periodic measurement reports received from the UEs 115. Thus, in some examples, the base station 105 may configure one or more UEs 115 for periodic measurements of each set of frequency bands at particular time intervals and request the UE 115 to transmit the measurement report to the base station 105 at the periodic intervals. For example, the base station 105 may configure the connected-mode UEs (e.g., UEs 115-a and 115-c) to perform periodic measurements for each set of frequency bands during particular time intervals. Additionally or alternatively, the base station 105 may page idle-mode UEs 115-b and configure them for intra-frequency and/or intra-frequency measurements. The measurement report(s) received from the UEs 115 may include at least one of a reference signal receive power (RSRP), reference signal received quality (RSRQ), a channel quality indicator (CQI), and/or a sounding reference signal (SRS) for each set of available frequency bands.

Based on the received measurement report(s), the base station 105 may calculate a statistical function for each set of frequency bands (e.g., first set of frequency bands and the second set of frequency bands). That is, the base station 105 may calculate, determine, or identify a different statistical function for each set of frequency bands. The statistical function may comprise at least one of a cumulative distribution function (CDF), a probability density function (PDF), or a combination thereof.

In some aspects, the base station 105 may further determine whether the signal quality for the UE 115-b, for example, satisfies a threshold calculated based on the statistical function. If the signal quality for the UE 115-b satisfies the threshold (i.e., the signal quality is greater than the threshold), the base station 105 may configure the UE 115-b to select the first set of frequency bands associated with the first coverage area 202 instead of the second set of frequency bands associated with the second coverage area 204. Accordingly, in some examples, the base station 105 may adjust idle-mode parameters associated with the UE 115-b based on the statistical function for the first set of frequency bands and the second set of frequency bands and force the UE 115-b in idle-mode to select the frequency band with more available bandwidth.

In some examples, adjusting the idle-mode parameters associated with the UE 115 may comprise identifying at least one of an average signal to interference plus noise ratio (SINR) or an average UE throughput associated with the UE 115 and selecting the idle-mode parameters to maximize the UE SINR and/or the average UE throughput. That is, the application of the idle-mode parameters that are selected results in the UE SINR and/or the average UE throughput being maximized. In other examples, adjusting the idle-mode parameters may comprise identifying uplink noise rise and/or cell throughput associated with the base station 105 and selecting the idle-mode parameters to reduce the noise rise and/or to maximize the cell throughput. Similarly, the application of the idle-mode parameters that are selected results in the noise rise being reduced and/or the cell throughput being maximized. In some aspects, the network device may adjust at least one of the first priority assignments, the second priority assignment, or an idle-mode parameter associated with the UE in order to achieve/maintain a target distribution across the plurality of frequency bands. In some aspects, the target distribution may comprise balancing traffic load between the first set of frequencies and the second set of frequencies within a load differential threshold.

For example, the base station 105 may monitor traffic load across the plurality of frequency bands and adjust the priority assignments based on active monitoring of the traffic load. For example, the base station 105 may monitor the traffic load (i.e., number of connected-mode UEs 115 and/or bandwidth requirements) on each of the first set of frequency bands and the second set of frequency bands.

Upon calculating the load (i.e., number of active users and/or bandwidth utilization) on each set of frequency bands, the base station 105 may thereafter measure the load differential between the first set of frequency bands and the second set of frequency bands. Calculating a load differential may comprise computing a difference between the first connected-load parameter (e.g., operating at 55% capacity) associated with the first frequency band and the second connected-load parameter (e.g., operating at 85% capacity) to determine the load differential.

In some aspects, the base station 105 may determine whether the load differential satisfies a load differential threshold. For example, if the load differential (e.g., 30% load differential between the first and the second frequency band) is greater than a load differential threshold (e.g., 95% load differential threshold), the base station 105 may dynamically configure the idle-mode parameters associated with the UE 115 to force larger number of UEs 115 to the first frequency band that may be operating at 55% capacity compared to the second frequency band that may be operating at 85% capacity. In some aspects, the load differential threshold may identify the ideal target distribution that is either fixed or dynamically configurable. Therefore, in some aspects, the network device (e.g., base station 105) may adjust the frequency priority assignments and/or idle-mode parameters to maintain traffic distribution between one or more frequency bands within an acceptable load differential threshold. If the load differential between the first frequency band and the second frequency band exceeds the fixed and/or dynamically adaptable load differential threshold, the base station 105 may adjust the priority assignments and/or idle mode parameters to reduce the load differential.

In some examples, the base station 105 may transmit the updated message(s) to the UE 115 comprising the adjusted priority values for each set of frequency band. Thus, as the real-time traffic or quality of service (QoS) demands increase, the network may be able to identify a connected-load parameter associated with each of the frequency bands in the frequency spectrum. The network may then adjust at least one or more idle-mode parameters of the UEs 115 in order to force UEs 115 to select a frequency band that has more available resources.

Figure 3:
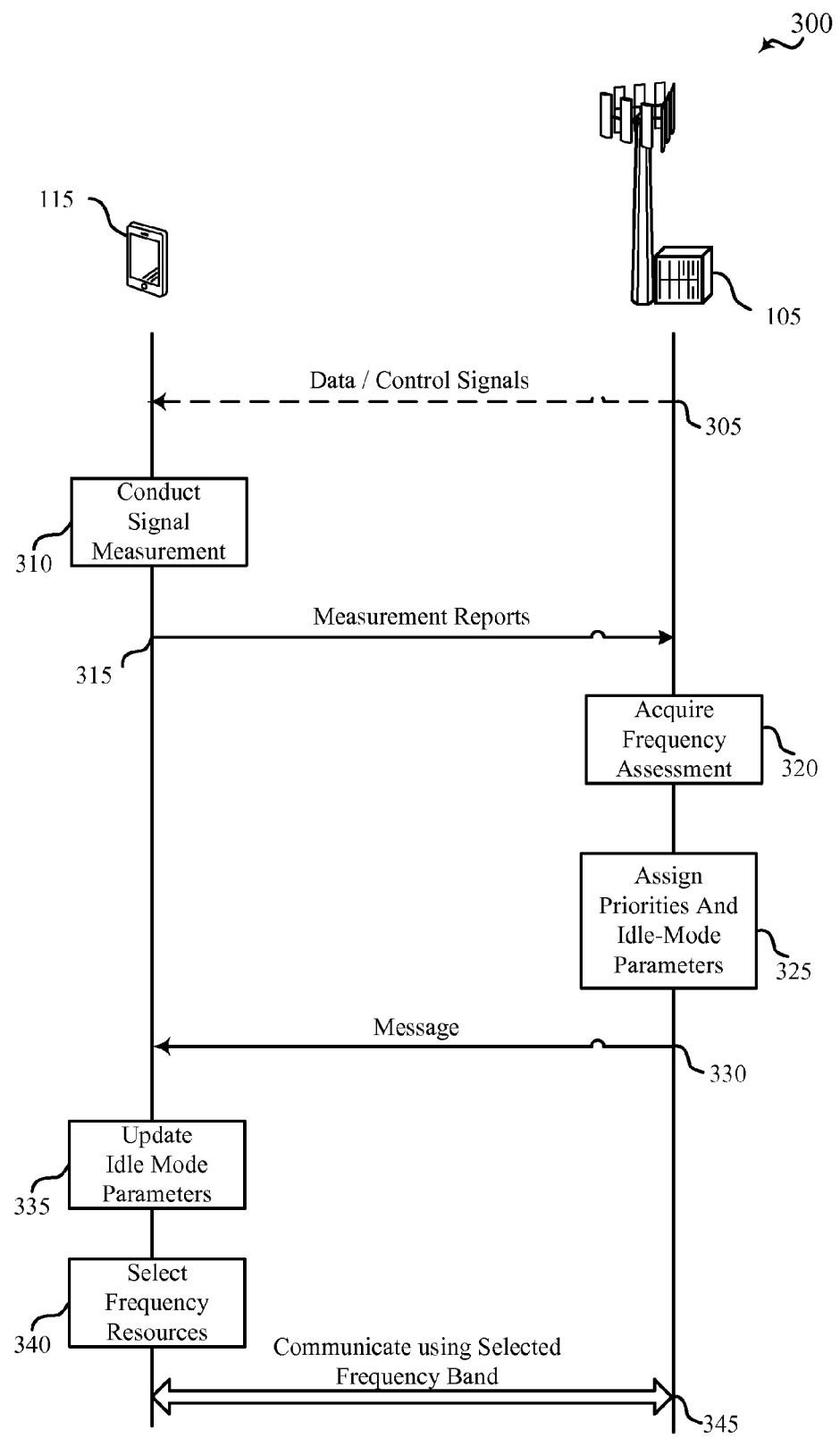
FIG. 3 illustrates a call flow diagram for traffic management in accordance with various aspects of the present disclosure.

FIG. 3 shows a flowchart 300 between base station 105 and UE 115. The base station 105 may be an example of base station 105 described with reference to FIGS. 1-2. The UE 115 may also be an example of one or more mobile devices/UEs 115 described with reference to FIGS. 1-2.

In some aspects, a base station 105, at 305, may transmit data/control signals to UE 115 in order to configure the UE 115 to perform inter-frequency and/or intra-frequency measurements on each set of frequency bands available for communication with the base station 105. In some aspects, data/control signals may include a message for RRC connected-mode UE 115 to perform periodic measurements for all available frequency bands during a particular time interval. In other examples, data/control signals may include a paging message to RRC idle-mode UE 115. Paging message may be needed to request the RRC idle-mode UE 115 to perform inter-frequency and/or intra-frequency measurements and provide the base station 105 with real-time RF survey assessment.

At 310, the UE 115 (either RRC connected-mode UE or RRC idle-mode UE) may periodically perform inter-frequency and/or intra-frequency measurements on each set of available frequency bands. The UE 115 may also generate a measurement report based in part on the inter-frequency and/or intra-frequency measurements. In some aspects, measurement report may include at least one of RSRP, RSRQ, CQI, and/or a SRS for each set of frequency bands. At 315, the UE 115 may transmit the measurement report to the base station 105.

The base station 105, at 320, may acquire frequency assessment for each set of frequency bands available for communication in the frequency spectrum. In some aspects, the base station 105 may calculate statistical function for each set of frequency bands (e.g., first frequency band and the second frequency band) based in part on the measurement reports. The statistical function may include CDF, PDF, and/or a combination thereof. Upon calculating the statistical function, the base station 105 may identify the coverage area of each set of frequency bands. For example, the base station 105 may identify a first coverage area of the base station associated with the first frequency band and a second coverage area of the base station associated with the second frequency band.

In further examples, the base station 105, at 325, may assign different priority values to each set of frequency bands based on identifying the various coverage areas of the base station associated with each set of frequency bands. For example, the base station 105 may assign a first priority value to the first frequency band and a second priority value to the second frequency band. In some examples, the first priority value of the first frequency band may be higher than the second priority value of the second frequency band. Additionally or alternatively, the first coverage area associated with the first frequency band may also be less than the second coverage area associated with the second frequency band. In other words, the base station 105 may assign priority values that are inversely proportional to the respective coverage area of each set of frequency bands. Additionally or alternatively, the base station 105, at 325, may adjust cell reselection parameters for the idle mode UEs 115. At 330, the base station 105 may transmit a message comprising the priority assignments and idle-mode parameter configurations to the UE 115.

At 335, the UE 115, upon receiving the message, may update the idle-mode parameters and select, at 340, for communication with the base station, frequency resources (e.g., a frequency band from a plurality of frequency bands) based at least in part on the priority assignments and idle-mode parameter configurations. Accordingly, at 345, when the UE 115 transitions from idle-mode to connected-mode, the UE 115 and the base station 105 may communicate utilizing the selected frequency band to transmit signals and/or data.

Based on the priority assignments, the base station 105 may further adjust cell reselection parameters for the idle mobile device 115 based on the current active user conditions by modifying one or more idle-mode parameters 440 associated with the UE 115. In some examples, the idle-mode adjustment component 435 may configure one or more idle-mode parameters 440 (FIG. 4) in order to encourage the UE 115 to select the first frequency associated with the first coverage area instead of the second frequency associated with the second coverage area based on determining that the signal quality is greater than the threshold. The base station 105 may transmit the idle-mode parameter(s) to the UE 115 in a message such that the idle-mode parameters 440 configures the UE 115 to select the first frequency band or the second frequency band for communication with the base station 105.

Figure 4:
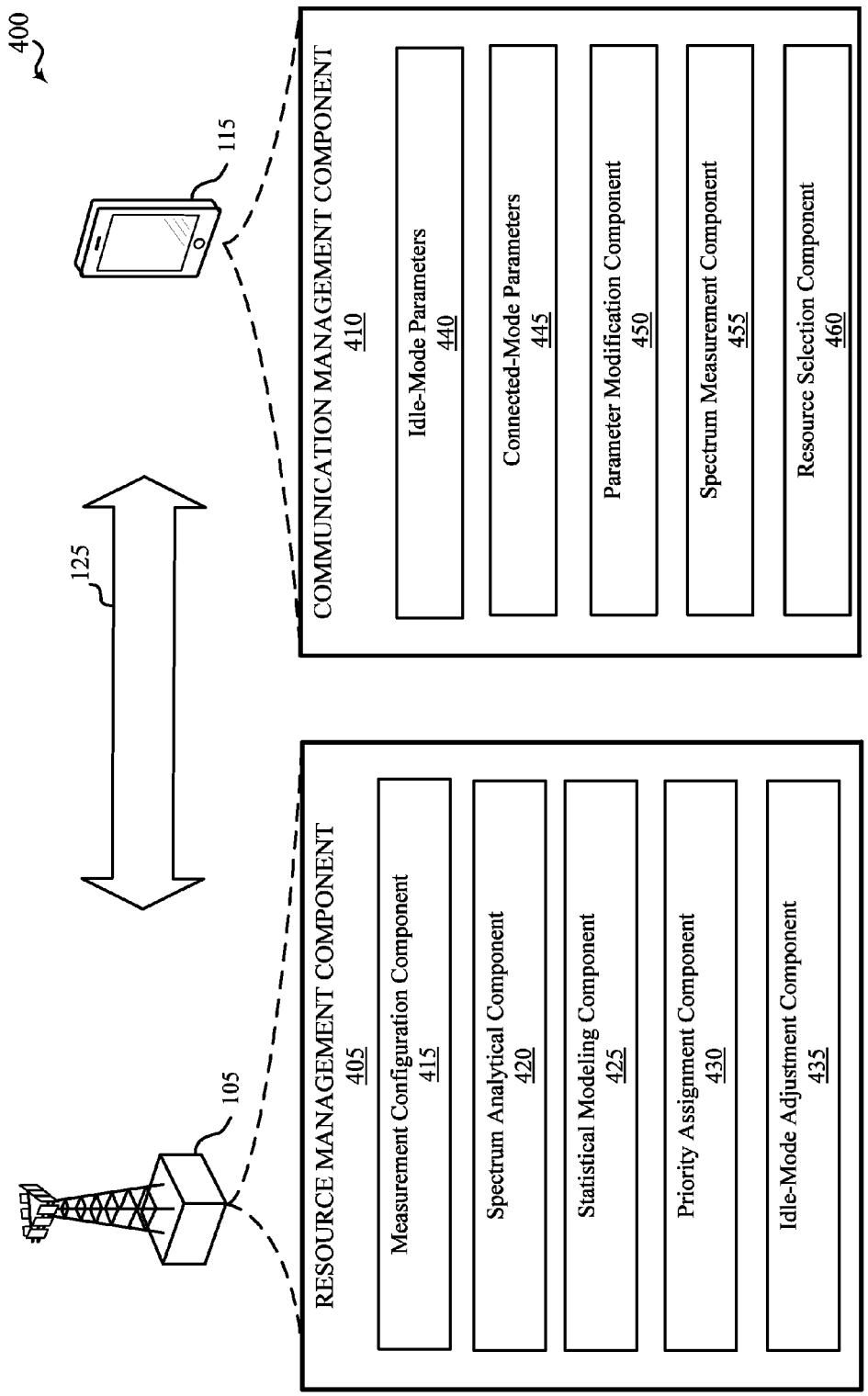
FIG. 4 illustrates an example of a schematic diagram of a communication network including aspects of base station and UE in accordance with various aspects of the present disclosure.

Referring now to FIG. 4, in an aspect, a wireless communication system 400 includes at least one base station 105 in communication with one or more UEs 115. In some examples, the base station 105 may be an example of base station 105 described with reference to FIGS. 1-3. Similarly, the UE 115 may be an example of one or more mobile devices/UEs 115 described with reference to FIGS. 1-3.

In some aspects, a base station 105 may include a resource management component 405 for managing traffic distribution across in a multi-band network in accordance with various aspects of the present disclosure. To that effect, the resource management component 405 may include a measurement configuration component 415 for configuring the UE 115 for periodic inter-frequency and/or intra-frequency measurements of each set of available frequency bands during a particular time interval. For example, the measurement configuration component 415 may configure the UE to perform inter-frequency and/or intra-frequency measurements on the first set of frequencies and the second set of frequencies during the particular time interval.

In response, the base station 105? may receive measurement reports) from the UE 115. In some examples, the UE 115, and more specifically the spectrum measurement component 455 associated with the communication management component 410 of the UE 115 may perform the inter-frequency and/or intra-frequency measurements and generate a measurement report. The measurement report may include, for each of the first frequency band and the second frequency band, at least one of a RSRP, RSRQ, CQI and/or SRS. In yet further examples, the connected-mode parameters 445 associated with each of the plurality of frequency bands may be computed based on at least a number of active users and load capacity for each of the frequency bands. In other examples, the connected-load parameter may comprise total transmit/receive power, interference in a cell, cell throughput in downlink/uplink, noise rise, number of resource blocks, number of scheduled users per TTI, RACH and/or PDCCH loading. The measurement configuration component 415 may further receive and process the measurement report transmitted by the UE 115.

In some examples, the spectrum analytical component 420 may be configured to identify propagation characteristics and/or coverage area of the base station 105 for each set of frequency bands. For example, the spectrum analytical component 420 may identify a first coverage area of the base station 105 for a first set of frequencies and a second coverage area of the base station 105 for a second set of frequencies based at least in part on the measurement report.

In some aspects, the spectrum analytical component 420 may utilize the statistical modeling component 425 to further analyze information associated with each set of frequency bands. For example, the statistical modeling component 425 may calculate a statistical function for the first set of frequencies (e.g., a first frequency band) and the second set of frequencies (e.g., a second frequency band) based at least in part on the measurement report. The statistical function may comprise at least one of a CDF, PDF, or a combination thereof. In yet further examples, the statistical modeling component 425 may determine whether the signal quality for the UE 115 with respect to each set of frequency bands (e.g., first frequency band and the second frequency band) satisfies a threshold. The threshold may be calculated based on the statistical function (e.g., CDF, PDF, or a combination thereof). It should be understood that the statistical function used to analyze information associated with each set of frequency bands and/or threshold values is not limited to only CDF, PDF, or a combination thereof. Instead, other statistical functions in the field may be readily used to analyze information with respect to each frequency band.

The statistical modeling component 425 may provide the results of the determination to the spectrum analytical component 420 to aid in configuring UEs 115 with acceptable RF coverage (i.e., greater than the threshold) to camp on a lowest coverage frequency band (e.g., first frequency band having a first coverage area 202 discussed with reference to FIG. 2) in lieu of a frequency band with a greater coverage (e.g., second frequency band having a second coverage area 204 discussed with reference to FIG. 2).

Based on the resource analytics performed on each set of available frequency bands by the spectrum analytical component 420 and the statistical modeling component 425, the UE 115, via priority assignment component 430 may assign different priority values to each set of frequency bands based on their respective coverage area. For example, the priority assignment component 430 may assign a first priority value to the first frequency band and a second priority to the second frequency band based on identifying the first coverage area and the second coverage area of the base station associated with the first and the second frequency bands, respectively. In some aspects, the first priority value may be higher than the second priority value, and the first coverage area associated with the first frequency band may be less than the second coverage area associated with the second frequency band. In other examples, the first priority value and the second priority value may be inversely proportional to the first coverage area and the second coverage area, respectively.

In some examples, the base station 105 may actively monitor the traffic load on the first frequency band and the second frequency band and adjust the first priority and the second priority assignments based on monitoring the traffic load. In further examples, the base station 105 may adjust at least one of the first priority assignment, the second priority assignment, or an idle-mode parameter associated with the UE based on a network key performance indicator (KPI).

Accordingly, in some aspects, adjusting the idle-mode parameter(s) 440 by the idle-mode adjustment component 435 associated with the base station 105 may include identifying at least one of an average signal to interference plus noise ratio (SINR) and/or an average UE throughput associated with the UE 115. The idle-mode adjustment component 435 may select the idle-mode parameter(s) to maximize the UE SINR or the average UE throughout. In other examples, adjusting the idle-mode parameters 440 associated with the UE 115 may include identifying at least one of an uplink noise rise or cell throughput associated with the base station 105 and selecting the idle-mode parameter to reduce the noise rise or to maximize the cell throughput. In some aspects, behavior of the UE 115 in connected-mode (i.e., via connected-mode parameters 445) may be affected by modifications to the idle-mode parameters 440 by the parameter modification component 450.

Thus, in some examples, the resource selection component 460 of the UE 115 may be configured to select the first frequency band or the second frequency band based on adjustments of idle-mode parameters 440 initiated by the base station 105.

Figure 5:
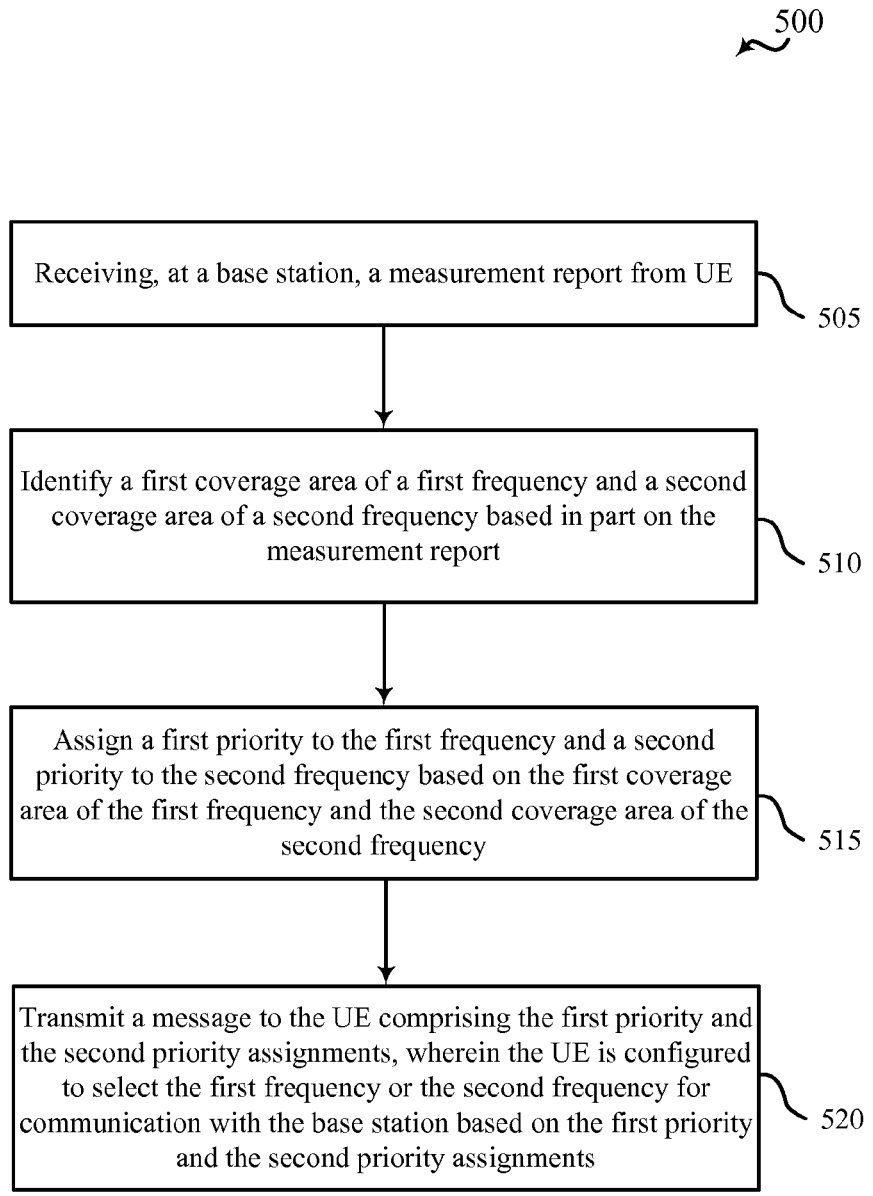
FIG. 5 illustrates an example of a flowchart that shows aspects for traffic management implemented in the network entity in accordance with various aspects of the present disclosure.

FIG. 5 is a flowchart conceptually illustrating an example of a method 500 of wireless communication, in accordance with aspects of the present disclosure. For clarity, the method 500 is described below with reference to base station 105, described with reference to FIGS. 1-3.

At block 505, the method 500 may comprise receiving, at a base station, a measurement report from the UE 115 (FIGS. 1-3). In some examples, the measurement report may be based on reference signal receiver power (RSRP), reference signal received quality (RSRQ), a channel quality indicator (CQI), and/or a sounding reference signal (SRS) received from the UE 115. Aspects of block 505 may be performed by a receiver 711 (see FIG. 7).

At block 510, the method 500 may comprise identifying a first coverage area of a base station for a first frequency band and a second coverage area of a base station for a second frequency band based in part on the measurement report. In some examples, the coverage area of the first frequency, second frequency, or frequency bands may be based on the propagation characteristics identified from the received measurement reports. Aspects of block 510 may be performed by spectrum analytical component 420 described with reference to FIG. 4.

At block 515, the method 500 may comprise assigning a first priority to the first frequency and a second priority to the second frequency based on the first coverage area of the base station for the first frequency and the second coverage area of the base station for the second frequency. In some examples, the value of the first priority and the value of the second priority may be inversely proportional to the first coverage area and the second coverage area, respectively. Aspects of block 515 may be performed by priority assignment component 430 described with reference to FIG. 4.

At block 520, the method 500 may include transmitting a message to the UE comprising the first priority and the second priority assignments. In some examples, the UE 115 may be configured to select the first frequency or the second frequency for communication with the base station based on the first priority and the second priority assignments. Aspects of block 520 may be performed by the transmitter 713 (see FIG. 7).

Figure 6:
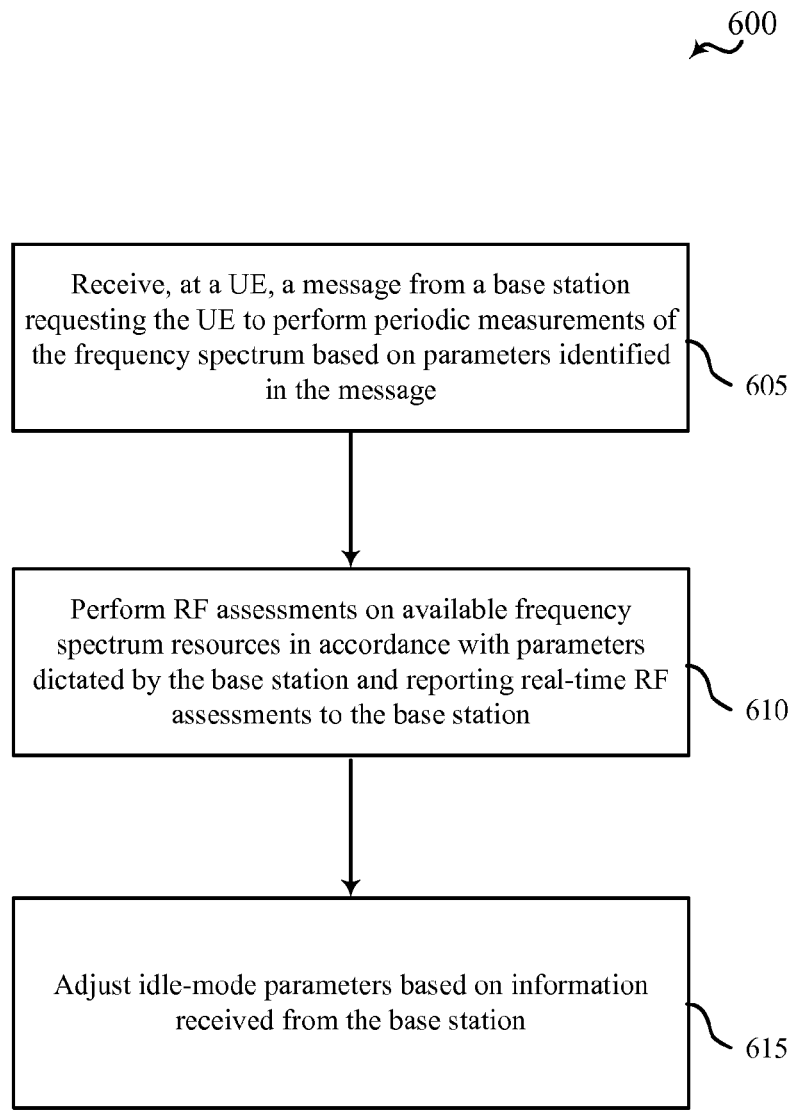
FIG. 6 illustrates an example of a flowchart that shows aspects for traffic management implemented in the UE in accordance with various aspects of the present disclosure.

FIG. 6 is a flowchart conceptually illustrating an example of a method 600 of wireless communication, in accordance with aspects of the present disclosure. For clarity, the method 600 is described below with reference to a mobile device/UE 115, described with reference to FIGS. 1-3.

At block 605, the method 600 may comprise receiving, at a UE, a message from a base station requesting the UE to perform periodic measurements of the frequency spectrum based on parameters identified in the message. In some examples, the base station 105 may utilize the UE's reported RSRP, RSRQ, CQI, and/or SRS measurements in order to characterize the RF assessment with respect to each frequency (e.g., frequency bands) available for establishing communication. In some aspects, if the UE 115 is in a radio resource control (RRC) connected-mode, the base station 105 may configure all the UEs 115 within its coverage area for periodic measurements with respect to all available frequency resources for a short period of time.

Additionally or alternatively, the base station 105 may configure the UE 115 for intra-frequency or inter-frequency measurements by utilizing the A2/A4 events, respectively. If, however, the UE 115 is in an RRC idle-mode, the message may be a paging message used for configuring the UE 115 to perform the inter-frequency and/or intra-frequency measurements during particular time intervals. Aspects of block 605 may be performed by spectrum measurement component 455 described with reference to FIG. 4.

At block 610, the UE 115 may perform RF assessments on all available frequency spectrum resources in accordance with parameters dictated by the base station. In some aspects, performing RF assessments on all available frequency spectrum resources may comprise the UE 115 determining signal quality on one or more frequencies within the frequency spectrum and reporting the real-time measurement report to the base station.

As discussed above, the base station 105 may utilize the measurement reports to characterize the RF assessment on all available frequencies and identify coverage area of the base station for each frequency. In some aspects, as discussed in method 500 of FIG. 5, the base station 105 may utilize the measurement reports to assign priorities to a plurality of frequencies based on their respective coverage area. For example, the base station 105 may assign priorities to the frequencies that are inversely proportional to the their respective coverage area, so as to encourage the UEs 115 with signal quality above a certain threshold to gravitate towards frequency resources that offer less coverage area and/or lower signal quality. Aspects of block 605 may be performed by spectrum measurement component 455 described with reference to FIG. 4.

At block 615, the UE 115 may adjust idle-mode parameters based on information received from the base station 105. In some examples, adjusting the idle-mode parameters may comprise maximizing the UE SINR and/or the average UE throughout. In other examples, idle-mode parameters may be adjusted to reduce the noise rise or to maximize the cell throughput. Accordingly, the UE 115 may select at least one of first frequency band or the second frequency band based on the priority assignments to each set of available frequency bands and adjustments made to idle-mode parameters associated with the UE 115. Aspects of block 615 may be performed by parameter modification component 450 described with reference to FIG. 4.

Figure 7:
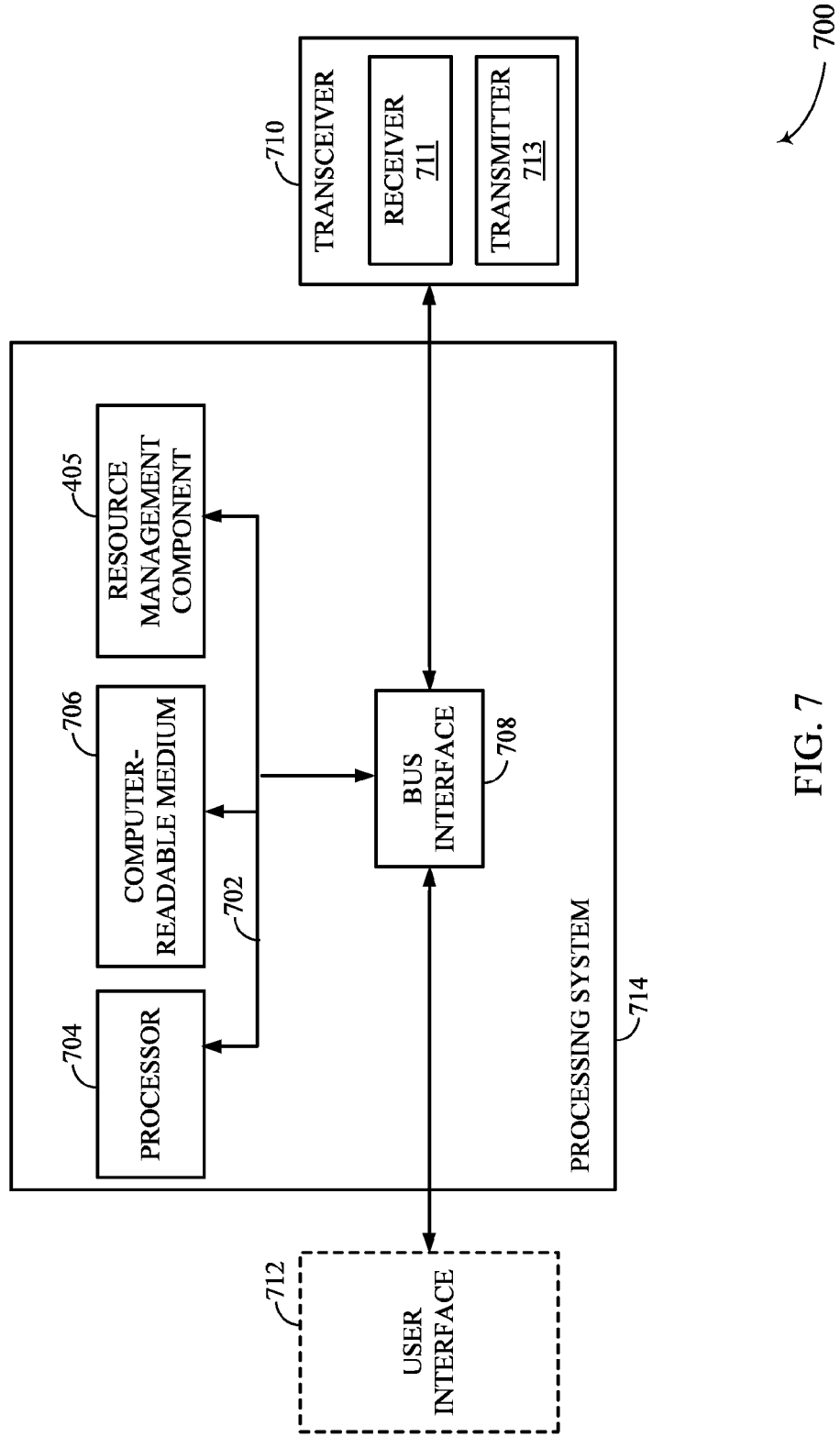
FIG. 7 is a diagram illustrating an example of a hardware implementation for an apparatus employing a processing system.

FIG. 7 is a conceptual diagram illustrating an example of a hardware implementation for an apparatus 700 employing a processing system 714. In some examples, the processing system 714 may be an example of base station 105 or AP 120 described with reference to FIGS. 1-4. In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors, represented generally by the processor 704, computer-readable media, represented generally by the computer-readable medium 706, and a resource management component 405 (see FIG. 4), which may be configured to carry out one or more methods or procedures described herein. In an aspect, resource management component 405 and the components therein may comprise hardware, software, or a combination of hardware and software that may be configured to perform the functions, methodologies (e.g., method 500 of FIG. 5), or methods presented in the present disclosure.

The bus 702 may also link various other circuits such as timing sources, peripherals, voltage regulators and power management circuits, which are well known in the art, and therefore, will not be described any further. A bus interface 708 provides an interface between the bus 702 and a transceiver 710. The transceiver 710 provides a means for communicating with various other apparatus over a transmission medium. In some examples, the transceiver 710 may include a receiver for receiving, at the processing system 714, a measurement report from UE 115. Additionally or alternatively, the transceiver 710 may include a transmitter 713 for transmitting one or more messages to the UE 115 that comprise the priority assignments or modified idle-more parameters. In other examples, the transmitter 713 may also transmit measurement configuration parameters to the UE 115 for configuring the UE for periodic measurements of the frequency spectrum (e.g., first frequency and the second frequency) during a predetermined time interval. In response, the UE 115 may transmit the measurement reports to the processing system 714 based on the periodic measurements that may be received by the receiver 711. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described infra for any particular apparatus. The computer-readable medium 706 may also be used for storing data that is manipulated by the processor 704 when executing software. In some aspects, at least a portion of the functions, methodologies, or methods associated with the resource management component 405 may be performed or implemented by the processor 504 and/or the computer-readable medium 706.

In some examples, the computer-readable medium 706 may store code for traffic management. The code may comprise instructions executable by processor 704 to receive, at a base station 105 (e.g., processing system 714), a measurement report from a UE 115. The code may further identify a first coverage area of a first frequency and a second coverage area of a second frequency based in part on the measurement report. In some aspects, the code comprising instructions executable by processor 704 may further assign a first priority to the first frequency and a second priority to the second frequency based on identifying the first coverage area and the second coverage area of the first and the second frequency. The instructions may further configure a transmitter 713 to transmit a message to the UE comprising the first priority and the second priority assignments. In some examples, the UE may be configured to select the first frequency or the second frequency for communication with the base station based on the first and the second priority assignments The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but are to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for traffic management in a wireless communications system, comprising:
   receiving, at a base station, a measurement report from a user equipment (UE);
   identifying a first coverage area of the base station for a first frequency and a second coverage area of the base station for a second frequency based at least in part on the measurement report;
   assigning a first priority to the first frequency and a second priority to the second frequency based on the first coverage area of the base station for the first frequency and the second coverage area of the base station for the second frequency; and
   transmitting a message to the UE comprising the first priority and the second priority assignments, wherein the UE is configured to select the first frequency or the second frequency for communication with the base station based on the first priority and the second priority assignments.

2. The method of claim 1, wherein, the first priority assigned to the first frequency associated with the first coverage area is a higher priority than the second priority assigned to the second frequency associated with the second coverage area, the first coverage area being less than the second coverage area.

3. The method of claim 1, wherein a first value of the first priority and a second value of the second priority are inversely proportional to the first coverage area and the second coverage area, respectively.

4. The method of claim 1, further comprising:
   calculating a statistical function for each of the first frequency and the second frequency based in part on the measurement report.

5. The method of claim 4, further comprising:
adjusting an idle-mode parameter associated with the UE based on the statistical function for the first frequency and the second frequency.

6. The method of claim 4, further comprising:
determining whether a signal quality for the UE satisfies a threshold, wherein the threshold is calculated based on the statistical function; and
configuring the UE to select the first frequency associated with the first coverage area instead of the second frequency associated with the second coverage area based on the determining that the signal quality satisfies than the threshold, the first coverage area being less than the second coverage area.

7. The method of claim 4, wherein the statistical function comprises at least one of a cumulative distribution function (CDF), a probability density function (PDF), or a combination thereof.

8. The method of claim 1, further comprising:
configuring the UE for periodic measurements of each of the first frequency and the second frequency during a particular time interval, wherein the UE transmits the measurement report to the base station upon completing the periodic measurements.

9. The method of claim 1, further comprising:
monitoring traffic load on the first frequency and the second frequency;
adjusting the first priority and the second priority assignments based on monitoring the traffic load to form an adjusted first priority and an adjusted second priority; and
transmitting an updated message to the UE comprising the adjusted first priority and the adjusted second priority assignments.

10. The method of claim 1, wherein the measurement report received from the UE comprises, for each of the first frequency and the second frequency, at least one of a reference signal receive power (RSRP), reference signal received quality (RSRQ), a channel quality indicator (CQI), a sounding reference signal (SRS), or any combination thereof.

11. The method of claim 1, wherein transmitting the message to the UE further comprises:
adjusting an idle-mode parameter associated with the UE; and
transmitting the idle-mode parameter to the UE in the message, wherein the idle-mode parameter configures the UE to select the first frequency or the second frequency for communication with the base station.

12. The method of claim 11, wherein adjusting the idle-mode parameter associated with the UE comprises:
identifying at least one of an average signal to interference plus noise ratio (SINR) or an average UE throughput associated with the UE; and
selecting the idle-mode parameter to maximize the UE SINR or the average UE throughout.

13. The method of claim 11, wherein adjusting the idle-mode parameter associated with the UE comprises:
identifying at least one of an uplink noise rise or cell throughput associated with the base station; and
selecting the idle-mode parameter to reduce the noise rise or to maximize the cell throughput.

14. The method of claim 1, further comprising:
adjusting at least one of the first priority assignment, the second priority assignment, and/or an idle-mode parameter associated with the UE based on a network key performance indicator (KPI).

15. The method of claim 1, further comprising:
adjusting at least one of the first priority assignment, the second priority assignment, and/or an idle-mode parameter associated with the UE to achieve a target distribution, wherein the target distribution comprises balancing traffic load between the first frequency and the second frequency within a load differential threshold.

16. An apparatus for traffic management in a wireless communication system, comprising:
a receiver for receiving, at a base station, a measurement report from a user equipment (UE);
a spectrum characteristic determination component for identifying a first coverage area of the base station for a first frequency and a second coverage area of the base station for a second frequency based at least in part on the measurement report;
a priority assignment component for assigning a first priority to the first frequency and a second priority to the second frequency based on the first coverage area of the first frequency and the second coverage area of the second frequency; and
a transmitter for transmitting a message to the UE comprising the first priority and the second priority assignments, wherein the UE is configured to select the first frequency or the second frequency for communication with the base station based on the first priority and the second priority assignments.

17. The apparatus of claim 16, wherein the first priority assigned to the first frequency associated with the first coverage area is a higher priority than the second priority assigned to the second frequency associated with the second coverage area, the first coverage area being less than the second coverage area.

18. The apparatus of claim 16, wherein a first value of the first priority and a second value of the second priority are inversely proportional to the first coverage area and the second coverage area, respectively.

19. The apparatus of claim 16, further comprising:
a statistical modeling component for calculating a statistical function for each of the first frequency and the second frequency based in part on the measurement report.

20. The apparatus of claim 19, further comprising:
an idle-mode adjustment component for adjusting an idle-mode parameter associated with the UE based on the statistical function for the first frequency and the second frequency.

21. The apparatus of claim 19, further comprising:
the spectrum characteristic determination component for determining whether a signal quality for the UE satisfies a threshold, wherein the threshold is calculated based on the statistical function; and
an idle-mode adjustment component for configuring the UE to select the first frequency associated with the first coverage area instead of the second frequency associated with the second coverage area based on the determining that the signal quality satisfies the threshold, the first coverage area being less than the second coverage area.

22. The apparatus of claim 16, further comprising:
measurement configuration component for configuring the UE for periodic measurements of the first frequency and the second frequency during a predetermined time interval, wherein the UE transmits the measurement report to the base station upon completing the periodic measurements.

23. The apparatus of claim 16, further comprising:
a traffic load monitoring component for monitoring traffic load on the first frequency and the second frequency;
a priority adaption component for adjusting the first priority and the second priority assignments based on monitoring the traffic load to form an adjusted first priority and an adjusted second priority; and
the transmitter for transmitting an updated message to the UE comprising the adjusted first priority and the adjusted second priority assignments.

24. The apparatus of claim 16, further comprising:
an idle-mode adjustment component for adjusting an idle-mode parameter associated with the UE; and
the transmitter for transmitting the idle-mode parameter to the UE in the message, wherein the idle-mode parameter configures the UE to select the first frequency or the second frequency for communication with the base station.

25. An apparatus for traffic management in a wireless communication system, comprising:
means for receiving, at a base station, a measurement report from a user equipment (UE);
means for identifying a first coverage area of the base station for a first frequency and a second coverage area of the base station for a second frequency based at least in part on the measurement report;
means for assigning a first priority to the first frequency and a second priority to the second frequency based on the first coverage area of the first frequency and the second coverage area of the second frequency; and
means for transmitting a message to the UE comprising the first priority and the second priority assignments, wherein the UE is configured to select the first frequency or the second frequency for communication with the base station based on the first priority and the second priority assignments.

26. The apparatus of claim 25, wherein the first priority of the first frequency associated with the first coverage area is a higher priority than the second priority of the second frequency associated with the second coverage area, the first coverage area being less than the second coverage area.

27. The apparatus of claim 25, wherein a first value of the first priority and a second value of the second priority are inversely proportional to the first coverage area and the second coverage area, respectively.

28. The apparatus of claim 25, further comprising:
means for calculating a statistical function for each of the first frequency and the second frequency based in part on the measurement report.

29. The apparatus of claim 28, further comprising:
means for adjusting an idle-mode parameter associated with the UE based on the statistical function for the first frequency and the second frequency.

30. A non-transitory computer-readable medium storing code for traffic management, the code comprising instructions executable to:
receive, at a base station, a measurement report from a user equipment (UE);
identify a first coverage area of the base station for a first frequency and a second coverage area of the base station for a second frequency based at least in part on the measurement report;
assign a first priority to the first frequency and a second priority to the second frequency based on the first coverage area of the first frequency and the second coverage area of the second frequency; and
transmit a message to the UE comprising the first priority and the second priority assignments, wherein the UE is configured to select the first frequency or the second frequency for communication with the base station based on the first priority and the second priority assignments.

* * * * *